United States Patent [19]

Menke

[11] 4,058,794
[45] Nov. 15, 1977

[54] VEHICLE BEACON CONTROL SYSTEM

[75] Inventor: W. Kenneth Menke, Glendale, Mo.

[73] Assignee: Public Safety Equipment, Inc., St. Louis, Mo.

[21] Appl. No.: 723,760

[22] Filed: Sept. 16, 1976

[51] Int. Cl.² .......................... B60Q 1/00; H02P 7/00
[52] U.S. Cl. ........................ 340/92; 340/50; 340/84; 318/265; 318/466
[58] Field of Search .................. 340/92, 87, 84, 50, 340/25; 318/102, 265, 443, 466, 470; 240/7.1 R, 49, 61.13

[56] References Cited

U.S. PATENT DOCUMENTS

| | | | |
|---|---|---|---|
| 3,611,094 | 10/1971 | Bischoff | 318/443 X |
| 3,732,537 | 5/1973 | Freeman | 340/92 X |
| 3,980,937 | 9/1976 | Bostrom et al. | 318/466 |
| 4,004,274 | 1/1977 | Menke et al. | 340/84 |

Primary Examiner—Donald J. Yusko
Attorney, Agent, or Firm—Gravely, Lieder & Woodruff

[57] ABSTRACT

A vehicle light control system for emergency and patrol vehicles equipped with emergency recognition rotating beacons in which the beacons are provided with side-facing flood lights for illuminating areas at one or both sides of a vehicle to provide means to observe conditions in the side areas of the vehicle position, and in which the control system provides means located inside the vehicle for directional control and selective operation of the side-facing lights with or without the operation of the rotating beacons.

10 Claims, 4 Drawing Figures

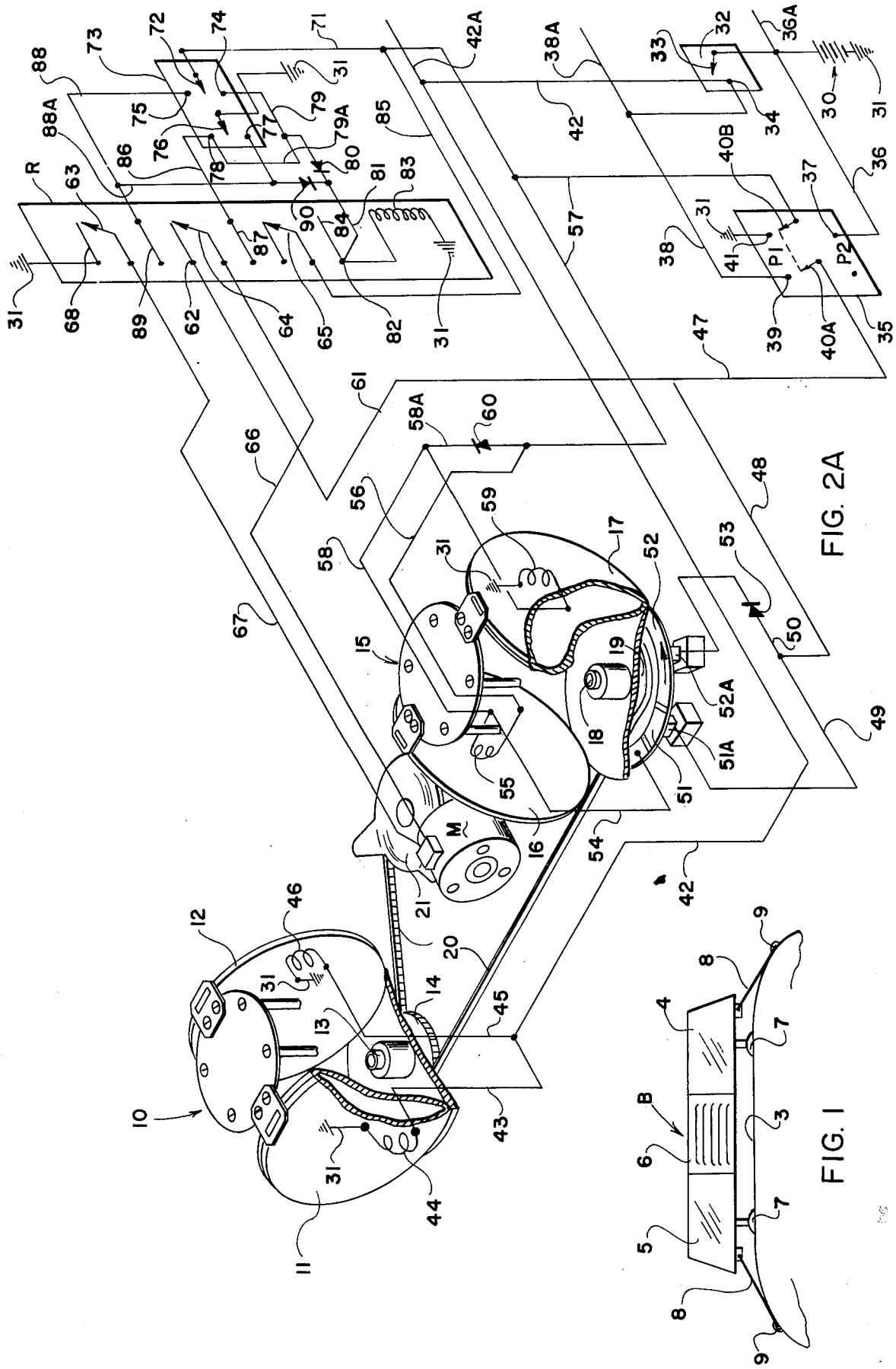

VEHICLE BEACON CONTROL SYSTEM

BACKGROUND OF THE INVENTION

In recent years beacons for many emergency vehicles, particularly police cruisers used for patrol work, have been provided with add-on, externally mounted, sidefacing floodlights, commonly called "alley lights". Such add-on lights are intended to permit vehicle operators to illuminate and observe areas to the side of the vehicle, such as store fronts, alleys or the like, located outside the area illuminated by the headlights of the vehicle. These external add-on lights are vulnerable to being damaged by vandals or in car washes, they are awkward in appearance, and in some instances they are so mounted as to block the light path of the rotating warning lights, thereby reducing the effectiveness of the beacon.

SUMMARY OF THE INVENTION

This invention relates to improvements in vehicle beacon light control systems which overcome the problems of prior vehicle lights and make the vehicle lights much more useful and versatile.

It is, therefore, an important object to provide an assembly of lamps for use on a vehicle beacon under the control of unique electrical circuits such that the lamps may be energized and rotated to obtain attention, the lamps may be arranged in separate groups for joint or individual operation, the lamps of one group may be rotated or directionally oriented independently of the other group, and the groups may be operated independently to serve different functions simultaneously.

According to this invention, the beacon light control system involves the use of lamps wired into a control circuit system in the vehicle for permitting the occupant to use the lamp as either a warning device or as a side light for illuminating areas not normally within the range of and full illuminating power of the conventional warning lights, or vehicle headlights. The control system permits the outboard lamp of the beacon light assembly to be used for side lighting in either a fixed position mode or in a selective directional mode.

In a preferred embodiment the outboard lamp or lamps for a double end beacon, utilizes a dual-filament to produce increased candle power for more effective area illumination. In the preferred embodiment, the dual-filament lamp is employed so that a control circuit can be made operative to energize one filament for normal rotating lamp operation, or to energize both filaments when side area lighting is desired. As a means of reducing current drain on the vehicle power supply, when the side lighting mode is selected, the cooperating lamp is extinguished.

BRIEF DESCRIPTION OF THE DRAWINGS

The preferred embodiments of this invention are exemplified in and by the accompanying drawings, wherein:

FIG. 1 is a fragmentary front view of a vehicle roof on which the beacon light assembly of FIGS. 2A and 2B is mounted;

FIGS. 2A and 2B are perspective views of only so much of the vehicle beacon light assembly and control circuits as will serve to illustrate the principle of the invention, details of structure being omitted for clarity of disclosure.

DETAILED DESCRIPTION OF THE EMBODIMENT

Figure 2B:
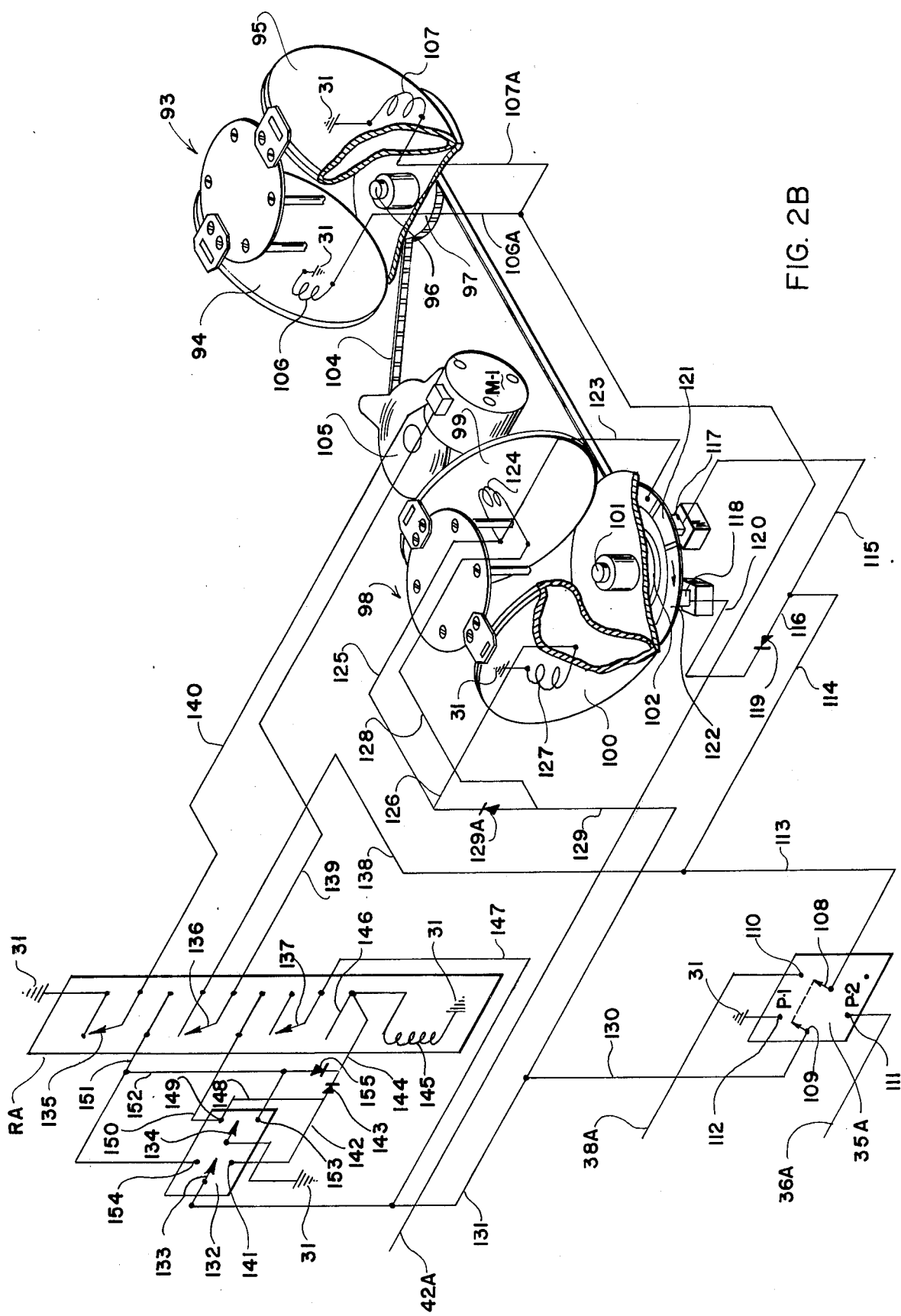

FIG. 1 illustrates a complete double end beacon B mounted on the roof 3 of a vehicle. The beacon B is positioned to extend across or from side to side of the vehicle so that signal lamps and area lighting lamps can be energized in accordance with the novel control circuits to be set forth herein. The beacon B supports transparent covers 4 and 5 spaced apart at the outer ends, and a middle cover 6 to enclose accessories, such as a siren or speaker horn, or both. Suitable support feet 7 engage the roof 3, and holddown straps 8 and gutter clamps 9 secure the beacon in position. As will appear the views of FIGS. 2A and 2B are substantially mirror images of each other, except that there is a common control switch and a common source of electrical power in the form of a battery. The following description will proceed with a description of FIG. 2A, followed by a description of FIG. 2B, thereby providing a better understanding of the embodiments.

FIG. 2A shows that the lamp arrangement under the transparent cover 4 (FIG. 1) includes a dual lamp pod 10 having lamps 11 and 12. The pod 10 rotates about the axis of the mounting shaft 13 connected to a pulley 14. A second dual lamp pod 15 has lamps 16 and 17, and is rotatable about the axis of the mounting shaft 18 which is connected to pulley 19. A common drive belt 20 is trained about pulleys 14 and 19 and about a similar pulley (not shown) under the gear box 21. The motor M operates the gear box 21 to reduce the speed to that desired for rotating the pods 10 and 15.

In FIG. 2A it can be seen that the energizing circuit for the respective lamps in pods 10 and 15 and for motor M begins at the battery 30 which is grounded at 31 to the vehicle frame (not shown but well known in the art). A lamp energizing control switch 32 has its movable contact arm 33 arranged to engage the circuit-make contact 34 when it is desired to operate the lamps in the pod 10 and condition the lamps in pod 15 and motor M for operation. A two position secondary switch 35 of double pole, double throw type is connected to the battery by lead 36 to one contact 37, and by lead 38 to contact 39 through the switch 32 at contact 34. The switch 35 must be in position one (P-1) with its movable arm 40A engaged at contact 39 and arm 40B engaged at a ground contact 41.

With the switches 32 and 35 in the lamp rotating warning mode, current is supplied by lead 42 in a first circuit from switch 32 to the pod 10 where it splits into branch 43 to energize filament 44 in lamp 11, and into branch 45 to energize filament 46 in lamp 12. Both filaments are grouned at 31 to complete the circuit back to battery 30. At the same time current is supplied in a second circuit by arm 40A of the secondary switch 35 to circuit lead 47. Lead 47 has one branch 48 which, in turn, has two branches 49 and 50 so that current is present at either collector or slip ring segments 51 or 52 for the pod 15. This is accomplished by a contact brush 51A and by a second brush 52A contacting the segments 51 and 52 of the slip ring segments. The branch lead 50 to brush 52A is provided with a blocking diode 53 to limit the current flow to one direction. For convenience in this disclosure, but not by way of limitation, ring segment 51 is shown located to be about 90° away from the beam alignment from lamp 17 so that when that lamp 17 is directed to the side of the vehicle it can be stopped and then employed to illuminate the side area or an alley or similar area. It is understood that both brushes 51A and 52A supply current to the lamps 16 and 17, except at the selected alignment position where the segment 51 is in contact with these brushes. The necessary ground for filament 55 is established through lead 56 and lead 57 back to arm 40B of switch 35, contact 41 and ground 31. A second lead 58 out of lamp 16 is provided for supplying current at the same time to filament 59 in lamp 17 and back to ground 31. Lead 58 has a branch lead 58A which connected into a blocking diode 60 which prevents current flow beyond that point, as will appear presently.

In order to energize the motor M and its connected gear box 21 for rotating the pods 10 and 15, there is a circuit set up as a branch of lead 47 which is shown at lead 61 connected into a 3-pole double throw relay R at stationary contact 62. The relay R is provided with movable contact arms 63, 64 and 65 which are all normally biased into the up position shown in FIG. 2A. As a consequence relay arm 64 makes contact with lead 66 which is connected into the motor M and the ground lead out of motor M is shown at 67 being connected into the relay arm 63 which is in contact at 68 with ground 31. As a result motor M is energized to rotate the pods 10 and 15, thereby moving the ring segments 51 and 52 over the respective brushes 51A and 52A in a sequence such that current will always be available at lead 54 to illuminate the filaments 55 and 59 in the respective lamps 16 and 17. Thus, the assembly of FIG. 2A can be operated by actuating switches 32 and 35 as previously described to rotate the pods 10 and 15 and illuminate the filaments in the respective lamps to produce the rotating warning signal light desired.

A unique feature of the present invention resides in the arrangement of the electrical circuits so that the pod 15 may be brought automatically to a position in which the lamp 17 is oriented to direct its light beam laterally of the vehicle. This lateral position of lamp 17 has been illustrated for convenience of the disclosure. This unique feature is accomplished by changing the position of switch 35 to the position P2 where the contact arm 40B now engages switch contact 37 and battery current is thereby made available at lead 57 while lead 47 is now de-energized due to switch arm 40A breaking contact with switch contact 39. When the switch 35 is moved to position P2 the electrical circuit is converted to a mode in which the motor M will operate for whatever fraction of a revolution is necessary to rotate lamp 17 to its laterally directed alignment. The circuit to motor M will be through lead 57, diode 60, lead 58, lead 54, segment brush 51A, leads 49, 48, 61, and relay contact 64 and lead 66. When segment 51 aligns with brush 51A it breaks contact with lead 54 and the motor M will stop. At this position the ring segment 52 will be engaged with brush 52A and current will be blocked by diode 53 from continuing to motor M. Current now from lead 57 will not be conducted to filament 55, but current will be conducted by lead 58A to filament 59 and to ground 31 to illuminate that lamp 17. The reason for the blocking diode 53 in lead 50 is now apparent since current cannot flow through lead 54 and ring segment 52 into lead 50 because of the presence of the blocking diode 53. As a consequence of the position P2 setting for switch 35, pod 15 will automatically rotate to the position shown in FIG. 2A where lamp 17 will be energized and positioned for illuminating the area at the side of the vehicle. At this setting of switch 35, the lamps in pod 10 will be on or off depending on the setting of switch 32.

A further unique feature of the present invention resides in the circuit arrangement now to be described which will permit directional control of pod 15 by momentary operation of motor M in either of two directions. Still with reference to FIG. 2A, and with switch 35 in position P2, current will be supplied from switch 35 and lead 57 to branch lead 71 which runs to the center arm 72 of a double pole double throw, center off, momentary switch 73. The arm 72 of switch 73 normally remains in the off or neutral position but can be manually moved into engagement with contact 74 or 75, and its companion arm 76 will move simultaneously to engage contact 77 or 78. As pointed out before the 3-position double throw relay R works in conjunction with the momentary switch 73 to determine the direction of rotation of the motor M and the duration of its operation so that the orientation of the beam of light from lamp 17 may be swung in azimuth to sweep an area laterally of the vehicle, as well as forwardly and rearwardly.

More specifically when switch 35 is moved to position P2 current is supplied through lead 71 to the center arm 72 of the switch 73. If it is desired to rotate pod 15 in a first direction then the arm 72 can be moved downwardly to engage contact 74 which will then supply current through lead 79 and diode 80 to lead 81, into contact 82 of relay R and then into the relay coil 83 which is grounded at 31. Coil 83 on being energized will operate the relay contact arms 63, 64 and 65 to pull them down thereby causing arm 65 to engage relay contact 84 establishing a holding circuit for the coil 83 through lead 85 and lead 71. Simultaneously current will flow through branch lead 79A to contact 78 in the switch 73 and then to lead 86 into the relay contact 87 which will establish current flow through the relay arm 64 which is now in contact at 87 and into lead 66 to motor M. The opposite side of the motor is grounded at 31 through lead 67, arm 63 of relay R and relay contat 89, lead 88A, contact 77, arm 76 to ground 31. Thus, motor M will run in one direction for as long as the switch arm 72 is held engaged with contact 74 and arm 76 with contact 77. It should be understood that arm 72 may be moved momentarily and repeatedly to engage contact 74 thereby rotating the pod 15 in desired increments.

Should it be necessary to rotate the pod 15 in the opposite direction, switch arm 72 must be moved to engage contact 75 in switch 73 and arm 76 to engage 78 to set up a circuit to ground 31. This switch movement will then apply current to lead 88 and directly into relay contact 89 as well as into a branch lead 88A. The lead 88A is connected through diode 90 into lead 81 which will again apply current to the relay coil 83 moving all of the arms 63, 64 and 65 downwardly to again establish the coil holding circuit through relay arm 65 and the circuit leads 85 and 71. Simultaneously relay arm 63 in moving into engagement contact 89 will supply current through lead 67 to motor M which is just the reverse of the previous circuit described, and the opposite side of the circuit will be established through lead 66, relay arm 64, contact 87 and lead 86 into switch contact 78 which will be grounded through switch arm 76 to ground 31. Thus, motor M will rotate in the opposite direction and pod 15 will move reversely to the first described direction of rotation. Again, momentary movement of switch arm 72 to engage contact 75 and arm 76 into contact 78 will result in the pod 15 being rotated in increments for directing the light beam from lamp 17 as desired.

Thus with the use of switch 73 and its associated relay R, the light beam from lamp 17 in pod 15 may be moved in azimuth in either direction by manipulating switch arm 72 in the manner described above. The operator can thus start and stop rotation, can reverse rotation so as to illuminate an area outside of the vehicle which requires observation or inspection. At any time, the operator can move switch 35 to position P1, close switch 32, and pods 10 and 15 will automatically return to the rotating warning light mode.

Reference will now be made to FIG. 2B which shows the lamp arrangement under the transparent cover 5 of FIG. 1. In this lamp arrangement there is a pod 93 provided with lamps 94 and 95 supported for rotation around a center post 96 which is attached to a gear 97. A companion pod 98 is provided with lamps 99 and 100 which are mounted to rotate about a center post 101 which is connected to a gear 102. The gears 97 and 102 are interconnected by a drive belt 104 which is operated through a gear not shown on a gear box 105 connected to motor M1. This arrangement is similar to the rotatable pod arrangement of FIG. 2A. Current for energizing the filaments 106 and 107 in lamps 94 and 95 respectively is supplied through the switch 32 (FIG. 2A) which connects battery 30 through lead 42, branch lead 42A and to branch 106A for filament 106 and to branch 107A for filament 107. The respective filaments are conveniently grounded at 31. The assembly of FIG. 2B is also provided with a separate control switch 35A which is a double-pole double throw switch having movable arms 108 and 109. Arm 108 is adapted to make and break a connection at contact 110 and arm 109 is adapted to make and break alternate connections at contacts 111 and 112, contact 112 being connected into ground 31. Switch 35A, therefore, has a position P1 and a separate position P2. The circuits corresponding to the P1 position wil now be described.

When switch 32 is moved to make contact at contact 34 current will be supplied to branch lead 38A connected into contact 110 at switch 35A. This will supply current through switch arm 108 and into lead 113 which establishes two results. The first result is that current is supplied through branch lead 114 and into branches 115 and 116, thereby supplying current to a contact brush 117 through branch lead 115 and current to brush 118 through diode 119 and lead 120. In the position shown in FIG. 2B brush 117 is in contact with a short slip ring segment 121 and brush 118 is in contact with a much larger slip ring segment 122. For convenience of disclosure, the orientation of slip ring 121 is selected to be about 90° away from the beam alignment from lamp 100. However, the slip ring segments and brushes may have other orientations to do the same thing. These slip ring segments rotate with pod 98 and thereby supply current to lead 123 which is connected into filament 124 of lamp 99. Lead 123 continues through filament 124 to lead 125 and into branch lead 126 which is connected to filament 127 in lamp 100 and then to ground 31 for energizing filament 127. The filament 124 in lamp 99 is energized due to a circuit established through lead 128 and lead 129 back to lead 130 and through arm 109 of switch 35A to contact 112 and ground 31. Thus, the filaments in the respective lamps in pods 93 and 98 can be illuminated by closing common switch 32 and moving switch 35A into positon P1. The second result is that motor M1 is energized to rotate the pods through a circuit established through contact arm 108 making a circuit with lead 113 and branch 138 which connects into a 3-pole double throw relay RA which functions similarly to the relay R. The relay RA is provided with 3 movable arms 135, 136 and 137 which are normally held in the up position as shown, and in this position current to motor M1 is provided through lead 138 through relay arm 136 and lead 139 which is connected into the motor M1. The opposite side of the circuit is established through lead 140, relay arm 135 and ground 31. This latter circuit will cause the pods 93 and 98 to rotate in a fixed direction.

If switch 35A is moved to the position P2, current from battery 30 will flow through lead 36A, switch contact 111, arm 109 and into lead 130. At this point branch lead 131 will not have any effect, but branch lead 129 will be energized to effect automatic rotation of pod 98 into its position where lamp 100 will be directed laterally of the vehicle and illuminated, while lamp 99 will be extinguished. Current in lead 129 will flow through a blocking diode 129A and through lead 126 to filament 127 which will illuminate as it is grounded at 31. Simultaneously current will flow in lead 125 and lead 123 into slip ring segment 122. Current cannot flow through brush 118 and lead 120 because of the blocking diode 119. However, current can pass brush 117 and into lead 115 which will energize the motor M1 through leads 114 and 138 into relay RA and to motor leads 139 and 140 to ground 31. Thus, motor M1 will run until brush 117 contact the insulated slip ring segment 121 at which time it will stop and leave the lamp 100 laterally oriented as desired.

The control over rotation of pod 98 in FIG. 2B is attained through a double pole double throw, center off, momentary switch 132 by moving switch arm 133 and 134 either up or down to reverse the direction of rotation. If the arm 133 is moved downwardly to engage contact 141 a circuit is established through lead 142, diode 143 and lead 144 into the relay coil 145 for relay RA which is grounded at 31. Energizing the coil 145 will move all of the relay contact arms 135, 136 and 137 into the opposite or down position which will cause the relay arm 137 to engage contact 146 and establish a coil holding circuit 147 which is connected into power lead 131. Simultaneously current will be supplied through branch lead 148 to switch contact 149 and lead 150 to relay arm 136 which is in circuit with lead 139 for motor M1. The opposite side of the circuit will be established through lead 140, relay arm 135 to lead 151 and branch lead 152 to switch contact 153 which through arm 134 is connected to ground 31. All of the foregoing is dependent upon switch 35A having been moved into position P2 so that current will be on lead 130 and center arm 133 of switch 132. If the motor M1 is to be rotated in the opposite direction switch arm 133 and arm 134 should be moved up to engage contacts 154 and 149 respectively so that current will be supplied through lead 152 and diode 155 to lead 144 which is in circuit with the relay coil 145, thereby drawing all of the relay arms into the down position so that current will then be picked up by relay arm 135 and conducted by lead 140 to motor M1. The grounded side of motor M1 will be established to 139, relay arm 136, lead 150 to contact 149 on switch 132 where movable arm 134 will establish the connection at ground 31.

The foregoing description may be summarized in the following outline of the several functions which are determined by manipulation of switches 32, 25, 35A, 73 and 132.

When switch 32 is open, and switches 35 and 35A are in their respective positions P1, the beacon will not be operative because no current is in leads 38 and 38A, or in diode 42 and 42A.

When switch 32 is open, and switch 35 is closed in the position P2 current will flow in lead 57 and, as described above, the pod 15 will automatically run to its lateral or alley position and lamp 17 will be illuminated.

When switch 32 is open and switch 35A is moved to position P2 the pod 98 will be caused to rotate automatically into the alley position and lamp 100 will be illuminated.

Of course, with switch 32 open and both switches 35 and 35A in the positions P2, both pods 15 and 98 will automatically rotate into the alley positions and the lamps 17 and 100 will be illuminated.

While the foregoing conditions of operation are obtainable with switch 32 open, a different result can be obtained with switch 32 closed.

With switch 32 closed and switch 35 and 35A in the positions P1, all lamps in the beacon will be illuminated and all pods will rotate to set up a conventional warning signal.

With switch 32 closed and switch 35 in position P1, with switch 35A in position P2, pods 10 and 15 will rotate and all their lamps will be illuminated. At this time, pod 98 will automatically go to the alley position and lamp 100 will be illuminated. Now, if switch 35A is put in the position P1 and switch 35 put in position P2 the opposite result will occur. That is pods 93 and 98 will rotate with their lamps illuminated, while pod 15 will automatically go to the alley position with its lamp 17 illuminated.

The closing of switch 32, with switches 35 and 35A in the positions P2, will result in the pods 15 and 98 turning to the alley positions, lamps 17 and 100 illuminated, and the lamps in pods 10 and 93 being illuminated and aligned with the light beams directed to the front and rear of the vehicle. Additionally and with this switch setting, the alley position of pods 15 and 98 can be changed by manipulating switches 73 and 133 respectively and in the manner described.

Figure 3:
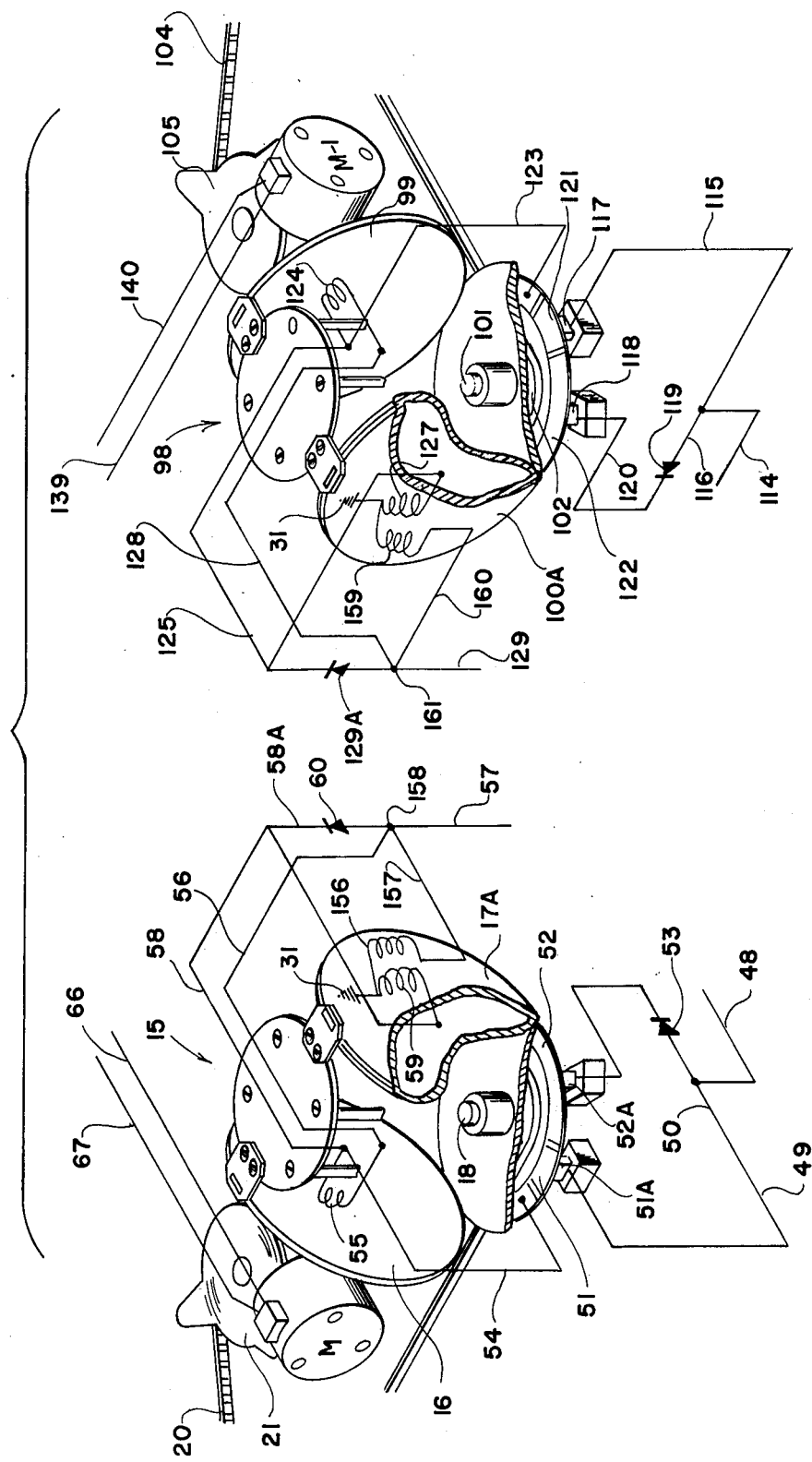
FIG. 3 is a fragmentary circuit diagram for adapting each of the outboard lamps of FIGS. 2A and 2B to utilize two filaments in the novel system of control.

While the broad principals of the present improvement have been set forth in the description applied to FIGS. 2A and 2B, the presently preferred embodiment for lamps 17 and 100 is shown in FIG. 3, and like parts elements shown in FIGS. 2A and 2B are repeated in FIG. 3 and are denoted where possible by similar reference numerals. The preferred embodiment comprises the addition of a second filament 156 in lamp 17A so as to increase the candle power and therefore improve area illumination. As shown, filament 156 is connected by lead 157 into junction 158 with lead 57. As described above in FIG. 2A, with switch 35 in position P1, lead 57 is connected through switch arm 40B to ground 31 so that both ends of the filament 156 are grounded. However, when switch 35 is moved to position P2 lead 57 then becomes a hot line and current is supplied to lead 157 and into filament 156 which is grounded at 31 on its opposite side. Simultaneously current is supplied through diode 60, branch lead 58A, lead 58 into filament 59 and ground 31 so that the filament 59 is also energized.

The pod 98 at the right hand side of FIG. 3 is shown with a modified lamp 100A which includes, in addition to filament 127, a second filament 159 which is connected by lead 160 into junction 161 at lead 129. Since the pod 98 has its separate control switch 35A, it is necessary in order to energize both filaments 127 and 159 in lamp 100A, to move switch 36A to position P2 which will supply current through lead 129 and junction 161 to lead 160 which energizes filament 159. Simultaneously current is transmitted through diode 129A and by lead 125 to filament 127. Filament 124 of lamps 99 is not energized at this time.

From the foregoing description it is made to appear that switch 32 shown in FIG. 2A is common to both of the pod assemblies in the opposite ends of the beacon B, and this switch not only turns on the lamps in the inboard pods 10 and 93 respectively but also supplies power to the respective switches 35 and 35A when those switches are in position P1. It should be appreciated that switches 35 and 35A may be operated independently of each other so that the pods in one side of the beacon may be operated in the rotating warning mode while the opposite pods in the beacon may be utilized in a mode for area lighting laterally or forwardly or rearwardly of the vehicle. It is believed that the various possibilities for operating the lamps in the respective pods 10, 15, 93 and 98 will be understood from the foregoing description.

The view of FIG. 2A has included the motor control override switch 73 and its relay R for rotating pod 15 as desired in opposite direction from the automatic alley light position. If the override circuitry is not desired, or if a simplified beacon is desired because of price considerations or no need for directional control of the motor M, the switch 73 and its relay R can be eliminated by joining lead 61 directly to lead 66, by grounding lead 67, and by disconnecting lead 71 from lead 57. The same changes can be made in the view of FIG. 2B by connecting lead 138 directly to lead 139, by connecting lead 140 to ground, and by disconnecting lead 131 from lead 130. It is not believed necessary to add specific drawing views to show the changes in the circuits to eliminate one or both switches 73 and 132 with the associated relays R and RA respectively.

In summary, the above described vehicle beacon light, in its simplest version may include a single rotatable pod, such as pods 15 or 98, may have at least one lamp, such as lamp 17 or 100, carried by the respective pods, may have independently operable motor means connected to rotate the respective pods, may have a common source of electrical power, such as the battery 30, and suitable electrical circuit connections between the source of power, the motor means and the lamp in each pod such that the circuit connections include a circuit path to the lamp in each pod to illuminate the lamp, and a second circuit path respective to pod rotation for automatically stopping the pod rotation in a predetermined position in which the illuminated lamp is in a desired orientation of its light beam. While the disclosure has included a pair of rotatable pods at each end of the beacon B as shown in FIG. 1, and each pod has been disclosed with a pair of lamps, it is understood that the overriding principle is carried into effect in terms of a single lamp in a single pod with electrical circuit means arranged to continuously rotate the pod while the lamp is illuminated and to automatically rotate the pod into a predetermined position where the illuminated lamp will provide alley lighting. A more sophisticated vehicle beacon light may be provided with cooperating switches and relays for overriding the alley light position of the pod so as to obtain desired directional control in opposite directions of rotation.

I claim:

1. In a vehicle beacon light: a rotatable pod; at least one lamp carried by said pod; motor means connected to said pod to rotate said pod; a source of electrical power; and electrical circuit connections between said power source, said motor means and said one lamp; said circuit connections including switch means establishing a first circuit path to said one lamp to illuminate the lamp, and a second circuit path responsive to pod rotation for automatically stopping pod rotation, said second circuit path including a contact means rotatable with said pod, a non-conductive portion in said rotatable contact means, and means cooperating with said rotatable contact means and non-conductive portion to determine the position for said automatic stopping of pod rotation.

2. The vehicle beacon light set forth in claim 1 wherein control means is connected into said second circuit path to override said automatic stopping of pod rotation and permit selective rotation of said pod in reverse directions.

3. In a vehicle beacon light: a rotatable pod; a pair of lamps carried by said pod; motor means operatively connected to said pod to rotate the same; a source of electrical power; a multiple position control switch; a first connection between said power source and said control switch when in a first position, a second connection between said power source and said control switch when in a second position; a first circuit connecting said control switch in its first position and said pair of lamps and said motor to illuminate said pair of lamps and rotate said pod; and a second circuit connecting said control switch in its second position and said pair of lamps and said motor means to illuminate one of said lamps and automatically stop rotation of said pod in a predetermined position.

4. The vehicle beacon light set forth in claim 3 wherein control means is connected into said second circuit to override said automatic stopping of rotation of said pod in said predetermined position and permit selective rotation of said pod in reverse directions.

5. In a vehicle beacon light: a pair of rotatable pods in spaced relation; at least one lamp in each pod; separate motor means for each of said pods connected for rotating said pods independently; a source of electrical power; separate electrical circuit connections between said power source and each of said motor means; a branch circuit connected between said separate electrical circuit connections and said one lamp in each of said pods; and motor control means in each of said branch circuit connections responsive to pod rotation for automatically stopping pod rotation by said motor means in a predetermined pod directional orientation, said motor control means being independent of each other for directional orientation of one pod independently of the other pod.

6. The vehicle beacon light set forth in claim 5, wherein said electrical circuit connections include means selectively operative to override said pod stoppage and select the direction and duration of rotation of said motor means.

7. The vehicle beacon light set forth in claim 6 wherein said selectively operative means includes separate manually operable switching means and cooperating circuit selecting relay means for changing the direction of rotation of each of said motor means.

8. In a vehicle beacon light the combination of: two pairs of rotatable pods, one pair being spaced from the other pair and said pairs of pods being in spaced relation transversely of the vehicle; lamps mounted in each pod; a source of electrical power; a separate motor for rotating each pair of pods; electrical circuits connecting said source of electrical power to said separate motors and to said lamps in said pods; and control means in said electrical circuits operatively arranged to control the energization of said motors and lamps, said control means including means carried by a pod in each pair of pods to break the electrical circuit to said motor connected to rotate said pods in each pair thereof to positions in which the lamps in said pods are stopped at a predetermined orientation, and manually operable circuit selecting means whereby said pairs of pods may be separately rotated and automatically directed, and whereby said lamps in a first one of said pods in each pair of rotatable pods may be energized independently of the other lamps in the second pod of each pair of rotatable pods.

9. The vehicle beacon light of claim 8 wherein said manually operable circuit selecting means includes circuit reversing relay means connected to each of said separate motors to change the direction of motor rotation, and switch means for each of said relay means to select the direction of motor rotation and the duration of rotation.

10. In a vehicle beacon light having a first rotary pod carrying a pair of lamps each with a single filament, a second rotary pod carrying a pair of lamps and in which one lamp has a single filament and a second lamp has first and second filaments, motor means connected to said pods to rotate the same, and conductive slip ring means carried by said second pod and divided into two electrically separate segments; the improvement in the beacon light which includes a source of electrical power; a first circuit connnecting said power source to each of the single filaments in said lamps of said first pod; a second circuit connecting said power source through said slip ring segments to said single filament of said one lamp and said first filament of said second lamp in said second pod, said second circuit having a branch circuit connected to said motor means to effect rotation of both said pods and with certain filaments in said respective lamps energized, and a further circuit connected to said first and second filaments of said second lamp; a switch in said first circuit to control the energizations of said single filaments in said lamps of said first pod; and a multiple position switch in said second and further circuits, said multiple position switch having a first position in which said second circuit and said branch circuit are connected to said power source and a second position in which only said further circuit is connected to said source of power to energize said first and second filament of said second lamp.

* * * * *

UNITED STATES PATENT AND TRADEMARK OFFICE
CERTIFICATE OF CORRECTION

PATENT NO. : 4,058,794
DATED : November 15, 1977
INVENTOR(S) : Kenneth W. Menke

It is certified that error appears in the above-identified patent and that said Letters Patent are hereby corrected as shown below:

Col. 3, line 50, at the beginning of the line, delete "n" and substitute therefor -- "in"

Col. 7, line 49, at the beginning of the line, before "elements", insert -- "and"

Col. 8, line 4, after "switch", delete the numeral reference "36A" and substitute therefor -- "35A"

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*